(12) United States Patent
Wilensky

(10) Patent No.: US 7,975,009 B2
(45) Date of Patent: Jul. 5, 2011

(54) INSTANT MESSAGE CONTACT ROUTER

(75) Inventor: Glenn Wilensky, Marietta, GA (US)

(73) Assignee: Aspect Software, Inc., Lombard, IL (US)

( * ) Notice: Subject to any disclaimer, the term of this patent is extended or adjusted under 35 U.S.C. 154(b) by 733 days.

(21) Appl. No.: 10/973,000

(22) Filed: Oct. 25, 2004

(65) Prior Publication Data

US 2006/0089971 A1  Apr. 27, 2006

(51) Int. Cl.
*G06F 15/16* (2006.01)
(52) U.S. Cl. ... 709/206; 709/202; 709/207; 379/265.02; 379/265.03; 379/265.05; 379/265.11
(58) Field of Classification Search .................. 709/202, 709/206, 207; 379/265.02, 265.03, 265.05, 379/265.11
See application file for complete search history.

(56) References Cited

U.S. PATENT DOCUMENTS

| | | |
|---|---|---|
| 5,555,179 A | 9/1996 | Koyama et al. |
| 5,765,033 A | 6/1998 | Miloslavsky |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Macleod Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,714,793 B1 | 3/2004 | Carey et al. |
| 6,732,156 B2 | 5/2004 | Miloslavsky |
| 6,760,580 B2 | 7/2004 | Robinson et al. |
| 7,206,934 B2 * | 4/2007 | Pabla et al. .................... 713/168 |
| 7,263,183 B1 * | 8/2007 | Klein et al. ............. 379/265.09 |
| 7,299,259 B2 * | 11/2007 | Petrovykh ..................... 709/205 |
| 2003/0009530 A1 * | 1/2003 | Philonenko et al. ........... 709/206 |
| 2003/0026289 A1 * | 2/2003 | Mukherjee et al. .......... 370/466 |
| 2004/0189698 A1 * | 9/2004 | Bokish .......................... 345/751 |

FOREIGN PATENT DOCUMENTS

| | | |
|---|---|---|
| WO | WO 02/45344 A2 | 6/2002 |
| WO | WO 03/025776 A1 | 3/2003 |
| WO | WO 2004/023701 A2 | 3/2004 |

* cited by examiner

*Primary Examiner* — Yves Dalencourt
*Assistant Examiner* — Michael C Lai
(74) *Attorney, Agent, or Firm* — Husch Blackwell LLP

(57) ABSTRACT

A method and apparatus are provided for processing an instant message within a system having a plurality agents for handling the instant message. The method includes the step of a buffer sever detecting an arrival of the instant message. The method also includes the steps of sending the instant message to one of a plurality of messages queues associated with the buffer server pending availability of one of the plurality of agents to handle the instant message and automatically generating and sending a status message to a source of the instant message while the message is in the message queue based upon the status of the instant message in the message queue.

20 Claims, 1 Drawing Sheet

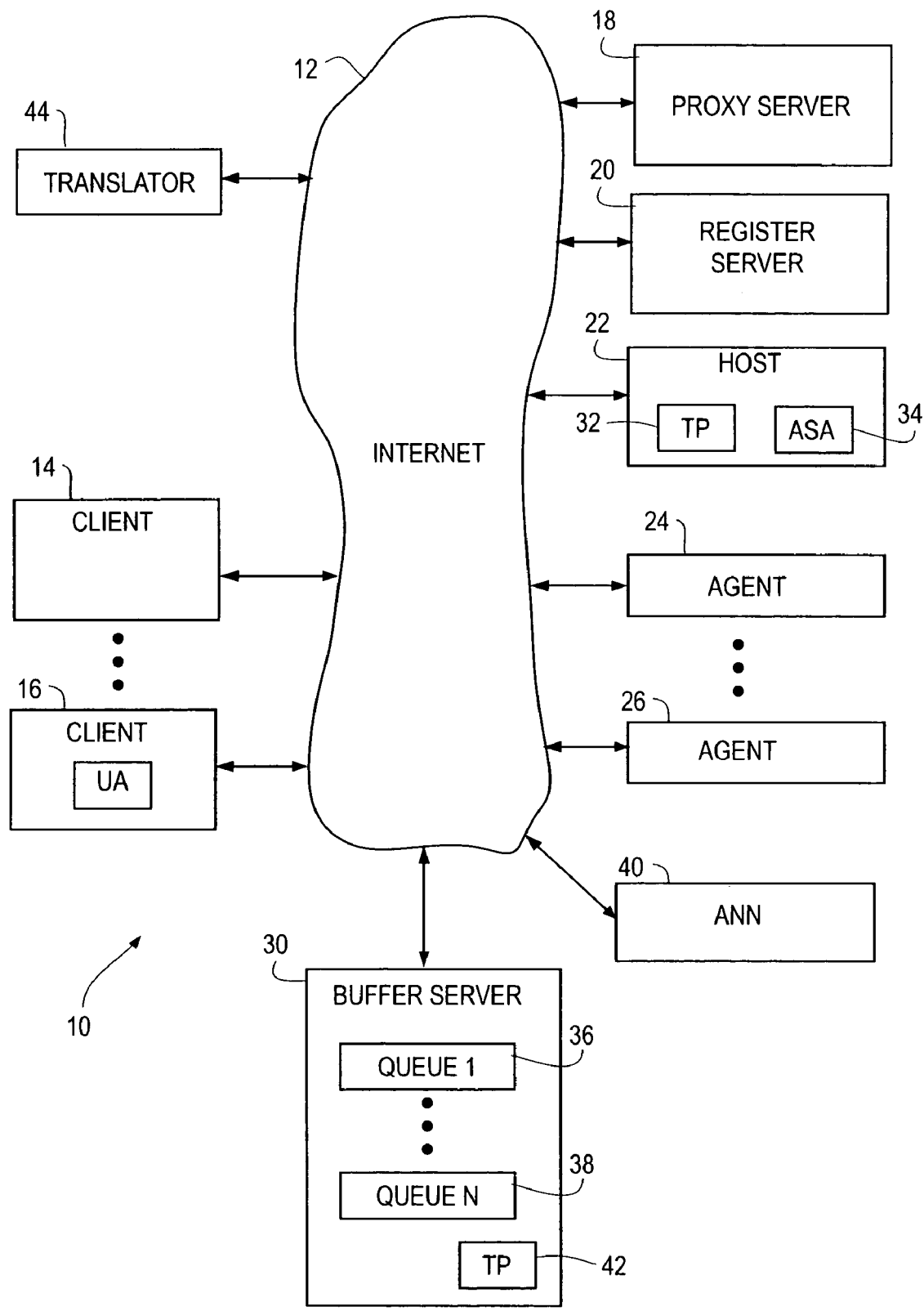

INSTANT MESSAGE CONTACT ROUTER

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers. Typically, calls are directed to a common telephone number and distributed to agents based upon some criteria (e.g., agent idle time).

ACDs can typically process both inbound and outbound calls. Typically, a controller monitors a workload of its agents. Where a workload of received calls fall below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to handling Internet calls. Further, the standards that are used for processing switched circuit calls within the PSTN cannot be used within the Internet. Accordingly, a need exits for a better method of processing calls that is adaptable to Instant Messaging (IM).

BRIEF DESCRIPTION OF THE DRAWINGS

FIG. 1 is a block diagram of an automatic contact processor in accordance with an illustrated embodiment of the invention.

SUMMARY

A method and apparatus are provided for processing an instant message within a system having a plurality agents for handling the instant message. The method includes the step of a buffer sever detecting an arrival of the instant message. The method also includes the steps of sending the instant message to one of a plurality of messages queues associated with the buffer server pending availability of one of the plurality of agents to handle the instant message and automatically generating and sending a status message to a source of the instant message while the message is in the message queue based upon the status of the instant message in the message queue.

DETAILED DESCRIPTION OF AN ILLUSTRATED EMBODIMENT

FIG. 1 depicts an automatic IM contact distributor system 10 shown in a context of use generally in accordance with an illustrated embodiment of the invention. As shown, the system 10 may initiate or respond to Instant Messages (IMs) (i.e., IM calls) through the Internet 12 or any other public or private network capable of handling IM traffic. While the system 10 will be described as operating under a Session Initiation Protocol (SIP) format, it should be understood that the system 10 could operate under any of a number of other formats (e.g., Instant Messaging under Yahoo, Instant Messaging under MSN, etc.), as described in more detail below.

In general, the system 10 may be used by any of a number of different organizations (e.g., commercial, environmental, political, etc.) to advance the agenda of the organization. Access to the IM contact distribution system 10 may be provided through the Internet under any of a number of different processes. In order to promulgate the agenda of the organization to its clients 14, 16, the organization may publish, by advertising or otherwise, one or more universal resource locators (URLs) that identify IM communication paths to the organization.

The system 10 may include a host 22 that places and receives IM calls and that distributes those calls to the agents 24, 26 of the organization. One or more agent selection applications 34 may be provided within the host 22 for detecting IM calls and for selecting an agent for handling each call.

IM calls may be placed to and received from the organization (i.e., from the system 10) using any of a number of different communication devices. For example, one client may place or receive IM calls through an IM enabled telephone 14 or personal computer 16 that is equipped with SIP communication software and that is connected directly to the Internet 12 or through an Internet Service Provider (ISP).

For example, to contact the organization, a client may enter a published URL of the organization into his SIP telephone 14. Entry of a URL into the SIP telephone 14 causes the telephone 14 to compose a number of messages that ultimately result in an IM call being directed to the organization.

In order to contact the organization, the telephone 14 must first locate a proxy server. To locate a proxy server, the telephone 14 may first perform a DNS SRV query to locate a proxy server 18 (e.g., at prox.com). Upon locating a proxy server, the telephone may compose a SIP SUBSCRIBE message that incorporates the entered URL and send the packet message to the proxy server 18. As used herein, a SUBSCRIBE message is an Internet SIP message composed in accordance with the Internet Engineering Task Force (IETF) RFC #3261.

The proxy server 18 may first determine whether the IM target (i.e., the system 10) has registered its presence with a registration server 20. If the system 10 has registered with the registration server 20, the proxy 18 may send a SIP NOTIFY message signaling the availability of the system 10 for receiving IM messages. The SIP NOTIFY message may include a Universal Resource Indicator (URI) of an IM address that is receiving IM message for the system 10. In the case of the system 10, the URI may be an identifier of the buffer server 30.

Upon receipt of the SIP NOTIFY message indicating the availability of the system 10, the telephone 12 may initiate the IM call by first sending a SIP INVITE to the returned URI, requesting an IM session. The TO field of the SIP INVITE may be directed to the buffer server 30 (e.g., "IMcall@bufferprocessor.com") and the FROM field may include a URL OR URI of the client 14 (e.g., "client14@aol.com"). The telephone 12 and buffer server 30 may negotiate and set up the IM session as described in IETF RFC#3261.

In addition to setting up the IM session with the client at the telephone 14, the buffer server 30 may open a call record and assign a unique call number to the IM session. The call record may include the source and destination URIs or URLs in the INVITE from the client 12 and the unique call identifier. The call record may be forwarded to the host 22 for processing and disposition of the call.

The buffer server 30 functions to conceal the destination Internet addresses of system resources of the system 10 from any serviced client 24, 26. The concealment of the URIs of system resources (e.g., agents 24, 26) from the client 14, 16 may be performed to allow the system 10 (under control of the organization) to transparently move IM calls among resources of the system 10 and to more effectively control agent utilization.

In general, the buffer server 30 is situated between the client 14 and resources of the system 10. On the system side, the buffer server 30 may use third party call control (as defined under SIP) to connect an agent terminal 24, 26 to the agent side of the buffer server 30 for the purpose of being joined with a caller. The event that triggers the agent side buffer server to initializes the third party call control software for a particular agent phone may be an agent becoming available for answering the IM call or be the agent signing in via a desktop application.

On the caller side, the buffer server 30 accepts SIP calls and exchange signals with the call center on behalf of the caller. Once the caller is essentially "parked" at the buffer server 30, IM contact center applications can direct the buffer server 30 to manipulate the signaling of the IM caller 12 for the purpose of treatment and ultimately connection with an agent.

Within the host 22, an agent selection application 34 may receive the call record from the buffer server 30 and determine a type of call involved. If the organization using the system 10 is a merchant, then the merchant may disseminate a different URL for each different product line. As such, the destination URL in the INVITE from the client 12 may provide information as to the product line (and type of IM call) involved. In addition the source URL or URI of the client 14 may also be compared with customer records to further differentiate types of calls.

Within the application 34, an agent 24, 26 may be selected to handle the call from an agent list. The agent list may contain a current list (URIs or URLs) of agents 24, 26 who have signed into the host 22 and are currently available to receive calls. Also included within the agent list may be a cross-referenced list of skills (e.g., call types) for which each agent is proficient.

The agent 24, 26 may be selected based upon idle time or upon skill in handling this particular type of call. Upon selection of an agent 24, 26, the application 34 may redirect the call to the selected agent (e.g., 24) in such a way as to route messages between the agent and client through a buffer server 30. The application may do this in any of a number of ways. As used herein, a buffer server is a processor (e.g., a router) that receives packets addressed to a first address and reroutes the packets to a second address based upon directives from a process within the IM contact distribution system 10 that is responsible for controlling the treatment of contacts.

If an agent is not available, then the host 22 may instruct the buffer server 30 to place the IM call into a queue 36, 38. The IM call may be placed into a queue (e.g., 36) based upon the determined call type. Once an agent becomes available, the buffer server 30 may complete the IM connection as discussed above.

While the IM call is waiting in the call queue, a tracking processor 32 within the host 22 may determine a position and measure a time that the IM call has been in the queue 36, 38. Periodically, the tracking processor 32 may instruct the buffer server 30 to connect the IM call to a status reporting processor 40.

In this case, the buffer server 30 may send a SIP INVITE to the reporting processor 40 requesting an IM session. The TO field of the SIP INVITE may include an address of the reporting processor (e.g., "status@reporting.processor.com"). The FROM field may provide an indicator of the queue for which the status in needed (e.g., "queue1@bufferprocessor.com"). The CALL ID field of the INVITE may include the call identifier assigned by the buffer server 30 to the IM session with the client 14.

In response, the reporting processor 40 may retrieve a list of IM calls ahead of the call in question and, possibly, a processing rate of the IM calls from the tracking processor 32. The reporting processor 40 may divide the number of calls ahead of the IM call by the processing rate to determine an estimated time until assignment to an agent. The reporting processor 40 may then compose a status message to the client 12. The message may be a text message stating that "THERE ARE X CALLS AHEAD OF YOU. PLEASE WAIT" OR "WE ESTIMATE THAT YOU WILL CONNECTED TO AN AGENT IN Y SECONDS".

The reporting processor 40 may set up a session with the buffer processor 30 and may return the status message within a SIP transmission. In this case, the TO field may be directed to the buffer server 40 (e.g., "queue1@bufferprocessor.com") with a FROM field of the reporting processor (e.g., "status@reporting.processor.com"). The CALL ID field may include the original call identifier assigned by the buffer server 30.

Within the buffer server 30, a translation processor 42 may recognize the transmission as being intended for the client 14 from the call identifier and queue number. The translation processor 42 may then re-encode the transmission (i.e., the status message) received from the reporting processor 40 and that is to be sent between the buffer server 30 and client 14. In this case, the translation processor removes the content of the TO field (e.g., "queue1@bufferprocessor.com") and replaces it with the address of the client (e.g., client14@aol.com"). Similarly, the translation processor 42 may remove the contents of the FROM field (e.g., "status@reporting.processor.com") and replaces it with the address of the buffer server 30 (e.g., "IMcall@bufferprocessor.com"). In this way, the buffer server 30 continues the IM session with the client 14 without changing the session parameters between the client 14 and buffer server 30.

After a period of time, an agent 24, 26 may become available and the buffer server 30 may complete the connection with the agent 24, 26. To complete a connection for the IM session between the agent 24 and client 14, the application 34 may send a message (e.g., the call identifier) to a buffer server 30 along with an identifier of the selected agent 24. The call identifier and identifier of the agent 24 may be forwarded to the buffer server 30 using an SIP instant messaging format or by encapsulating the INVITE and identifier using an appropriate tunneling protocol (e.g., PPP).

To set up the call, the buffer server 30 may first encode and send a SIP INVITE to the selected agent 24. The selected agent 24, may then negotiate and set up a session between the agent 24 and buffer server 30. In internal connection between the agent 24 and client 14 may be formed within the translation processor of the buffer server 30 to complete the end-to-end connection of the IM session between the agent 24 and client 14.

Under another illustrated embodiment, the system 10 may operate under any of a number of other IM formats (e.g., MSN Instant Messaging (MSN IM), AOL Instant Messaging (AOL IM), etc.). In this case, inbound and outbound traffic to the system 10 passes through a translator processor 44 where the formats of MSN IM and AOL IM are converted to a common format understood by the system 10. In other regards, the system 10 may operate in substantially the same way as described above.

A specific embodiment of method and apparatus for distributing calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing an instant message, from an instant message source, to a multi-agent contact distribution system having a plurality of agents for handling the instant message, the method comprising the steps of:
    receiving at a proxy server a subscription message from the instant message source incorporating a published address of the multi-agent contact distribution system;
    determining whether the multi-agent contact distribution system has registered a presence with a registration server and if registered, sending a message to the instant message source signaling availability of the multi-agent contact distribution system to receive instant messages and providing to the instant message source a unique instant message address different than the published address for the multi-agent contact distribution system to receive the instant message;
    receiving at a buffer server the instant message addressed to the unique instant message address from the instant message source and setting up an instant message session between the instant message source and the multi-agent contact distribution system and assigning a unique session ID in response thereto;
    sending the instant message to a message queue associated with the buffer server if none of the plurality of agents is available to handle the instant message; and
    automatically generating and sending a status message to the instant message source of the instant message while the message is in the message queue based upon the status of the instant message in the message queue by setting up an instant message reporting session between the buffer server and a reporting processor, the reporting processor creating the status message, sending the status message via an instant message in the instant message reporting session to the buffer server, the buffer server translating the status message to readdress the status message to the instant message source and sending the translated message to the instant message source.

2. The method of processing the instant message as in claim 1 further comprising determining a message type from a content of the instant message.

3. The method of processing the instant message as in claim 2 wherein the unique instant message address is a destination universal resource indicator (URI) of the unique instant message address for the multi-agent contact distribution system.

4. The method of processing the instant message as in claim 3 wherein the step of determining the message type further comprises matching the destination universal resource indicator with one of a plurality of predetermined universal resource indicators.

5. The method of processing the instant message as in claim 2 wherein the step of determining the message type further comprises recovering a source universal resource indicator of the instant message.

6. The method of processing the instant message as in claim 2 further comprising selecting one of the plurality of agents to handle the instant message based upon the determined message type and transferring the instant message to the selected agent of the plurality of agents.

7. The method of processing the instant message as in claim 1 further comprising defining the status message as being an indicator of a number of messages in the message queue ahead of the instant message.

8. The message of processing the instant message as in claim 1 further comprising defining the status message as being a time estimate before the message will be distributed to an agent and sending the instant message to one of a plurality of queues based upon a message type of the instant message.

9. The method of processing the instant message as in claim 1 further comprising determining an estimated time until assignment and including the estimated time in the status message and forwarding the status message within a SIP transmission from the reporting processor through the buffer server to the instant message source.

10. The method of processing the instant message as in claim 9 wherein the step of forwarding further comprises converting a source and a destination URL or URI for the forwarded message received by the buffer server to match that of the buffer server and the instant message source, respectively.

11. An apparatus for processing an instant message from an instant message source to a multi-agent contact distribution system, the apparatus comprising:
    a proxy server that receives a subscription message from the instant message source incorporating a published address of the multi-agent contact distribution system;
    a server that determines whether the multi-agent contact distribution system has registered a presence with a registration server and if registered, sends a message to the instant message source signaling availability of the multi-agent contact distribution system to receive instant messages and providing a destination instant message address for the multi-agent contact distribution system to receive the instant message;
    a buffer server that receives the instant message addressed to the destination instant message address from the instant message source;
    a host that determines a message type from a content other than user identification information of the instant message;
    a message queue that receives the instant message sent to the message queue based upon the determined message type;
    a reporting processor that automatically generates and sends a status message to the instant message source based upon the status of the instant message in the message queue; and
    a translation processor within the buffer server that forwards the status message, sent from the reporting processor by an instant message session to the buffer server, to the instant message source by converting a source and a destination URL or URI for the status message to match that of the buffer server and the instant message source, respectively.

12. The apparatus for processing the instant message as in claim 11 further comprising an agent selection application that selects one of the plurality of agents to handle the instant message.

13. The apparatus for processing the instant message as in claim 12 further comprising transferring the instant message to the selected agent of the plurality of agents.

14. The apparatus for processing the instant message as in claim 11 further comprising defining the status message as being an indicator of a number of messages in the queue ahead of the instant message.

15. The apparatus for processing the instant message as in claim 11 further comprising defining the status message as being a time estimate before the message will be distributed to an agent.

16. The apparatus for processing the instant message as in claim 11 wherein determining the message type further comprises recovering a destination universal resource indicator of the instant message.

17. The apparatus for processing the instant message as in claim 16 wherein determining the message type further comprises matching the recovered destination universal resource indicator with one of a plurality of predetermined universal resource indicators.

18. The apparatus for processing the instant message as in claim 16 wherein determining the message type further comprises recovering a source universal resource indicator of the instant message.

19. The apparatus for processing the instant message as in claim 11 further comprising the reporting processor forwarding the status message from the reporting processor to the instant message source through the buffer server.

20. The apparatus for processing the instant message as in claim 19 further comprising the buffer server converting a source and a destination URL or URI of the forwarded message to match that of the buffer server and the instant message source, respectively.

* * * * *